United States Patent
Saito et al.

(10) Patent No.: US 11,212,424 B2
(45) Date of Patent: Dec. 28, 2021

(54) DEVICE AND METHOD FOR COMPENSATION OF POWER SOURCE VOLTAGE DROP

(71) Applicant: SYNAPTICS INCORPORATED, San Jose, CA (US)

(72) Inventors: Satoshi Saito, Tokyo (JP); Kei Miyazawa, Tokyo (JP); Hidefumi Odate, Tokyo (JP); Jiro Shimbo, Tokyo (JP); Kazuyuki Tanimoto, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/582,797

(22) Filed: Sep. 25, 2019

(65) Prior Publication Data

US 2020/0112654 A1 Apr. 9, 2020

(30) Foreign Application Priority Data

Oct. 5, 2018 (JP) .............................. JP2018-189655
Sep. 25, 2019 (JP) .............................. JP2019-174211

(51) Int. Cl.
*H04N 5/202* (2006.01)
*G09G 3/3233* (2016.01)

(52) U.S. Cl.
CPC ........... *H04N 5/202* (2013.01); *G09G 3/3233* (2013.01)

(58) Field of Classification Search
CPC ...... H04N 1/6008; H04N 1/6066; H04N 9/64; H04N 9/67; H04N 5/202; H04N 5/64
See application file for complete search history.

(56) References Cited

U.S. PATENT DOCUMENTS

| | | | |
|---|---|---|---|
| 2006/0027822 A1* | 2/2006 | Choi | G09G 3/3233 257/94 |
| 2009/0189924 A1* | 7/2009 | Ogura | G09G 3/3233 345/690 |
| 2016/0055799 A1* | 2/2016 | Eom | G09G 3/3225 345/690 |

* cited by examiner

*Primary Examiner* — Samira Monshi
(74) *Attorney, Agent, or Firm* — Ferguson Braswell Fraser Kubasta PC (57) ABSTRACT

A display driver comprises drop amount calculation circuitry and digital gamma correction circuitry. The drop amount calculation circuitry is configured to calculate a drop amount of a power source voltage supplied to a display panel from a setting value. The digital gamma correction circuitry is configured to perform digital gamma correction on an input image data based on the drop amount.

27 Claims, 8 Drawing Sheets

DEVICE AND METHOD FOR COMPENSATION OF POWER SOURCE VOLTAGE DROP

CROSS REFERENCE

This application claims priority to Japanese Patent Application No. 2018-189655, filed on Oct. 5, 2018 and Japanese Patent Application No. 2019-174211, filed on Sep. 25, 2019, the disclosure of which is incorporated herein by reference in its entirety.

BACKGROUND

Field

Embodiments disclosed herein generally relate to a device and method for compensation of power source voltage drop.

Description of the Related Art

A drop of a power source voltage supplied to a display panel, such as an organic light emitting diode (OLED) display panel, may affect the image quality of the display panel.

SUMMARY

In one or more embodiments, a display driver comprises drop amount calculation circuitry and digital gamma correction circuitry. The drop amount calculation circuitry is configured to calculate a drop amount of a power source voltage supplied to a display driver from a setting value. The digital gamma correction circuitry performs digital gamma correction on an input image data based on the drop amount.

In one or more embodiments, a display driver comprises drop amount calculation circuitry and power management integrated circuit (PMIC) control circuitry. The drop amount calculation circuitry is configured to calculate a drop amount of a power source voltage supplied to a display driver from a setting value. The PMIC control circuitry is configured to generate, based on the drop amount, a control signal to control a PMIC generating the power source voltage.

In one or more embodiments, a display method comprises calculating a drop amount of a power source voltage supplied to a display driver from a setting value, and performing digital gamma correction on an input image data based on the drop amount.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

DETAILED DESCRIPTION

Figure 1:
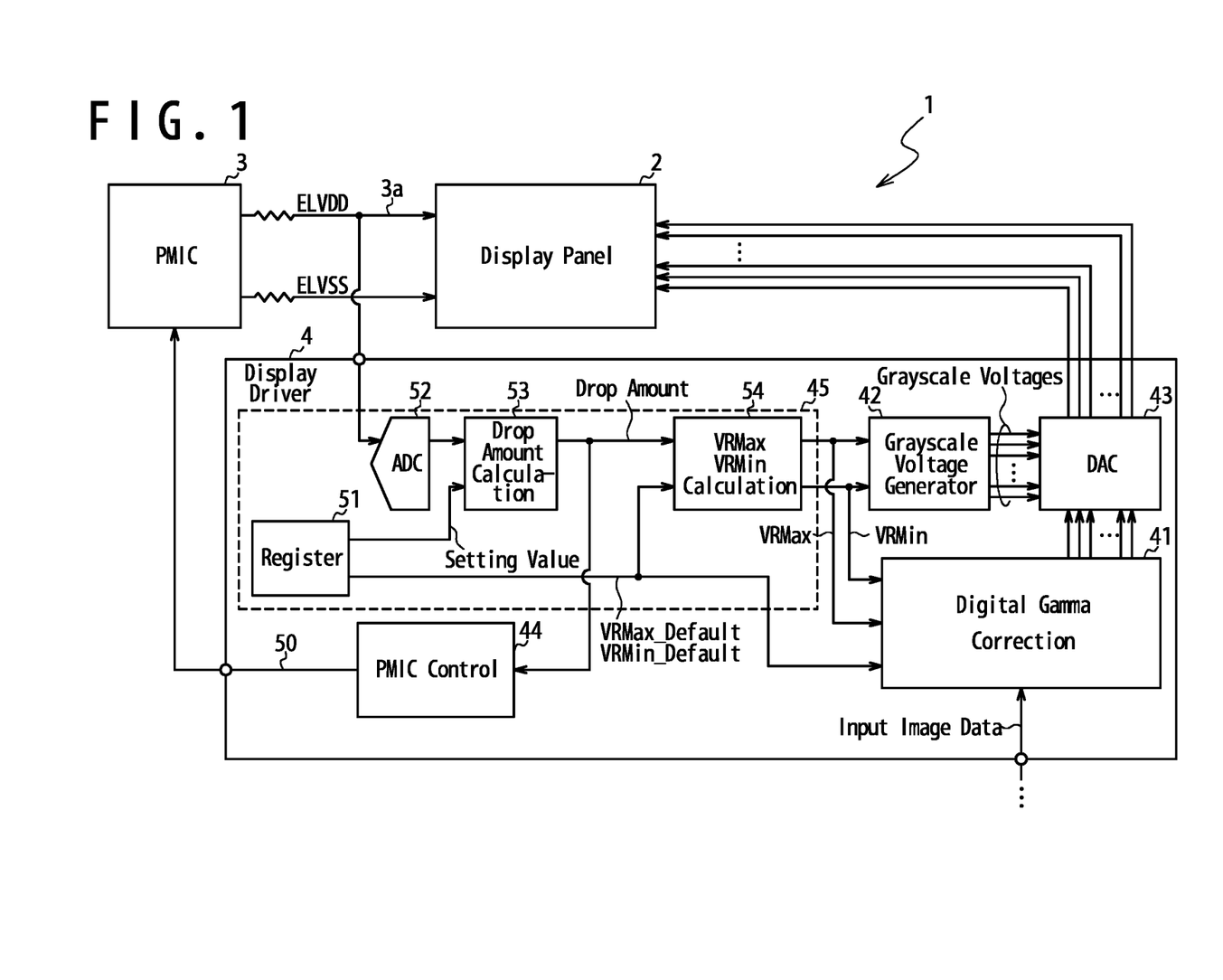
FIG. 1 is a block circuit diagram illustrating one example configuration of a display device, according to one or more embodiments.

In one or more embodiments, as illustrated in FIG. 1, a display device 1 comprises a display panel 2, a power management integrated circuit (PMIC) 3, and a display driver 4. In one or more embodiments, the display driver 4 is configured to display an image corresponding to an input image data received from a host (not illustrated) on the display panel 2. In one or more embodiments, the PMIC 3 is configured to generate a power source voltage ELVDD and a circuit ground voltage ELVSS and supply the same to the display panel 2.

Figure 2:
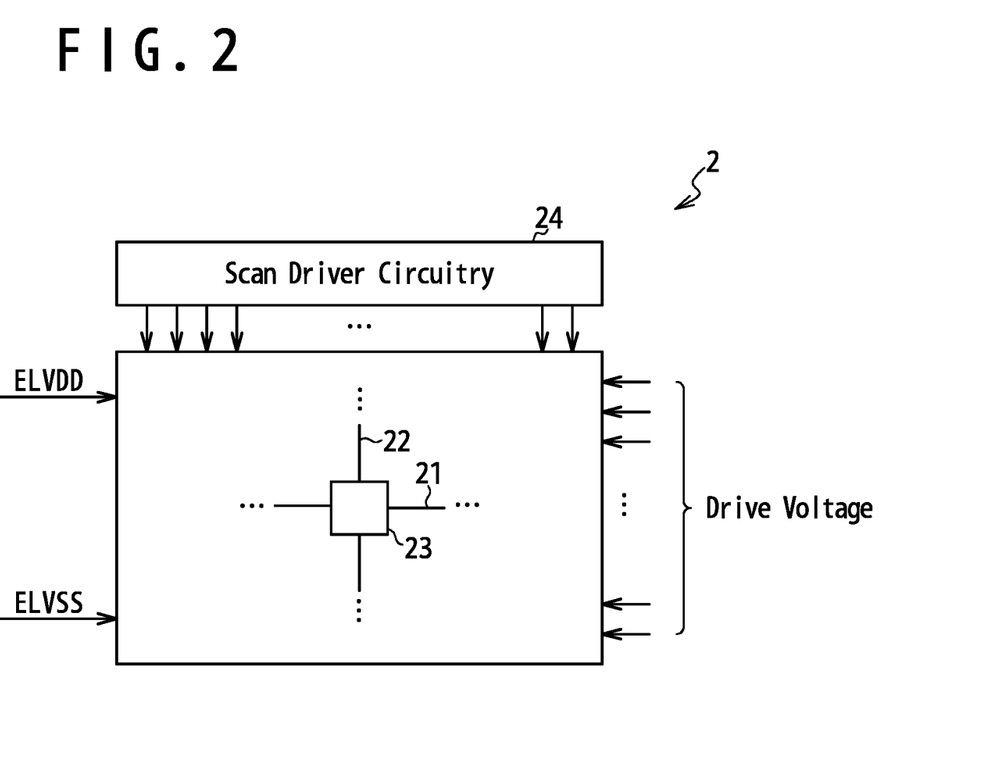
FIG. 2 is a block circuit diagram illustrating one example configuration of a display panel, according to one or more embodiments.

In one or more embodiments, the display panel 2 comprises an organic light emitting diode (OLED) panel. In one or more embodiments, as illustrated in FIG. 2, the display panel 2 comprises data lines 21 parallel to one another, scan lines 22 parallel to one another, pixel circuits 23 arrayed in rows and columns, and scan driver circuitry 24. In one or more embodiments, each pixel circuit 23 is configured to receive a drive voltage from the display driver 4 and emit light with a brightness level corresponding to the received drive voltage.

In one or more embodiments, the display driver 4 comprises digital gamma correction circuitry 41, grayscale voltage generator circuitry 42, digital-analog converter (DAC) circuitry 43, PMIC control circuitry 44, and grayscale voltage control circuitry 45.

In one or more embodiments, the digital gamma correction circuitry 41 is configured to perform digital gamma correction on the input image data to generate a corrected image data.

In one or more embodiments, the grayscale voltage generator circuitry 42 is configured to generate a set of grayscale voltages respectively corresponding to grayscale values allowed to be specified in the corrected image data and supply the generated grayscale voltages to the DAC circuitry 43. The highest one of the grayscale voltages generated by the grayscale voltage generator circuitry 42 may be hereinafter referred to as the highest grayscale voltage and the lowest one may be herein after referred to as the lowest grayscale voltage. In one or more embodiments, the grayscale voltage generator circuitry 42 is configured to generate the highest grayscale voltage and the lowest grayscale voltage and further generate intermediate grayscale voltages through voltage dividing of the highest grayscale voltage and the lowest grayscale voltage by using resistor-based voltage dividing circuitry.

In one or more embodiments, the DAC circuitry 43 is configured to perform digital-analog conversion on the corrected image data received from the digital gamma correction circuitry 41 to generate the drive voltages to be supplied to the pixel circuits 23. In one or more embodiments, the DAC circuitry 43 is configured to generate the drive voltages based on the grayscale voltages supplied from the grayscale voltage generator circuitry 42. In one or more embodiments, the DAC circuitry 43 is configured to select grayscale voltages corresponding to the grayscale values specified in the corrected image data from among the grayscale voltages supplied from the grayscale voltage generator circuitry 42, and output the selected grayscale voltages as the drive voltages.

In one or more embodiments, the PMIC control circuitry 44 is configured to generate a PMIC control signal 50 and supply the PMIC control signal 50 to the PMIC 3. In one or more embodiments, the voltage levels of the power source voltage ELVDD and circuit ground voltage ELVSS generated by the PMIC 3 are controlled based on the PMIC control signal 50.

In one or more embodiments, the grayscale voltage control circuitry 45 is configured to control the grayscale voltages generated by the grayscale voltage generator circuitry 42. In one or more embodiments, the grayscale voltage control circuitry 45 is configured to generate a highest grayscale voltage command value VRMax and a lowest grayscale voltage command value VRMin and supply the highest grayscale voltage command value VRMax and the lowest grayscale voltage command value VRMin to the grayscale voltage generator circuitry 42, where the highest grayscale voltage command value VRMax specifies the voltage level of the highest grayscale voltage and the lowest grayscale voltage command value VRMin specifies the voltage level of the lowest grayscale voltage. In one or more embodiments, the grayscale voltage generator circuitry 42 is configured to generate the highest grayscale voltage and the lowest grayscale voltage based on the highest grayscale voltage command value VRMax and the lowest grayscale voltage command value VRMin.

In one or more embodiments, the grayscale voltage control circuitry 45 is configured to control the grayscale voltages generated by the grayscale voltage generator circuitry 42 based on a voltage drop across a power source line 3a which supplies the power source voltage ELVDD to the display panel 2. In some instances, the voltage level of the power source voltage ELVDD actually supplied to the display panel 2 may not coincide with the voltage level of the power source voltage ELVDD on the output of the PMIC 3. For example, the power source voltage ELVDD supplied to the display panel 2 may be lower due to voltage drop caused by the resistance of the power source line 3a which transmits the power source voltage ELVDD from the PMIC 3 to the display panel 2. Such voltage drop may decrease the brightness of the display panel 2 and darken the displayed image. In one or more embodiments, to maintain the image quality of the display panel 2 in such a case, the grayscale voltage control circuitry 45 is configured to control the grayscale voltages based on the drop amount of the power source voltage ELVDD.

In one or more embodiments, the grayscale voltage control circuitry 45 comprises register circuitry 51, analog-digital converter (ADC) circuitry 52, drop amount calculation circuitry 53, and highest/lowest grayscale voltage value calculation circuitry 54.

In one or more embodiments, the register circuitry 51 is configured to hold various parameters used in the operation of the grayscale voltage control circuitry 45. In one or more embodiments, the register circuitry 51 is configured to hold a setting value of the power source voltage ELVDD supplied to the display panel 2, a default value VRMax_Default of the highest grayscale voltage command value VRMax, and a default value VRMin_Default of the lowest grayscale voltage command value VRMin.

In one or more embodiments, the ADC circuitry 52 is configured to receive the power source voltage ELVDD supplied from the PMIC 3 to the display panel 2 and perform analog-digital conversion on the received power source voltage ELVDD. In one or more embodiments, the ADC circuitry 52 operates as power source voltage measurement circuitry configured to generate a measured value of the power source voltage ELVDD supplied to the display panel 2. In one or more embodiments, to measure the power source voltage ELVDD actually supplied to the display panel 2, the ADC circuitry 52 is configured to receive the power source voltage ELVDD from a position of the power source line 3a, the position being is closer to the display panel 2 than to the PMIC 3. In one or more embodiments, the ADC circuitry 52 is configured to receive the power source voltage ELVDD from a position of the power source line 3a as close to the display panel 2 as possible. In one or more embodiments, the ADC circuitry 52 is configured to transmit the measured value of the power source voltage ELVDD to the drop amount calculation circuitry 53.

In one or more embodiments, the drop amount calculation circuitry 53 is configured to calculate a drop amount of the power source voltage ELVDD based on the measured value of the power source voltage ELVDD received from the ADC circuitry 52. In one or more embodiments, the drop amount calculation circuitry 53 is configured to read out the setting value of the power source voltage ELVDD from the register circuitry 51 and calculate the drop amount of the power source voltage ELVDD as being the difference between the measured value of the power source voltage ELVDD and the setting value read out from the register circuitry 51. In the following, the drop amount of the power source voltage ELVDD may be simply referred to as "drop amount." In one or more embodiments, the drop amount calculation circuitry 53 is configured to generate a digital signal indicative of the drop amount and transmit the same to the highest/lowest grayscale voltage value calculation circuitry 54.

In one or more embodiments, the PMIC control circuitry 44 is configured to generate the PMIC control signal 50 based on the drop amount of the power source voltage ELVDD calculated by the drop amount calculation circuitry 53. In such embodiments, the PMIC 3 is configured to generate the power source voltage ELVDD and supply the same to the display panel 2 so that the voltage level of the power source voltage ELVDD supplied to the display panel 2 approaches the setting value.

In one or more embodiments, the highest/lowest grayscale voltage value calculation circuitry 54 is configured to generate the highest grayscale voltage command value VRMax and the lowest grayscale voltage command value VRMin to be supplied to the grayscale voltage generator circuitry 42 based on the drop amount of the power source voltage ELVDD calculated by the drop amount calculation circuitry 53.

In one or more embodiments, the highest/lowest grayscale voltage value calculation circuitry 54 is configured to calculate the highest grayscale voltage command value VRMax and the lowest grayscale voltage command value VRMin by correcting the default values VRMax_Default and VRMin_Default stored in the register circuitry 51 based on the drop amount calculated by the drop amount calculation circuitry 53. In one or more embodiments, the highest/ lowest grayscale voltage value calculation circuitry 54 is configured to determine a correction amount based on the drop amount and calculate the highest grayscale voltage command value VRMax and the lowest grayscale voltage command value VRMin by correcting the default values VRMax_Default and VRMin_Default based on the correction amount. In one or more embodiments, the highest grayscale voltage command value VRMax is the sum of the default value VRMax_Default and the correction amount and the lowest grayscale voltage command value VRMin is the sum of the default value VRMin_Default and the correction amount. In one or more amount, the correction amounts to be added to the default values VRMax_Default and VRMin_Default may be different depending on the characteristics of the display device 1. This may improve the brightness balance by reducing or suppressing an effect of variations in the correspondence relation between the grayscale value and the grayscale voltage. In one or more embodiments, the highest/lowest grayscale voltage value calculation circuitry 54 is configured to transmit the highest grayscale voltage command value VRMax and the lowest grayscale voltage command value VRMin to the grayscale voltage generator circuitry 42.

In one or more embodiments, to improve the image quality, the digital gamma correction circuitry 41 is configured to control the input-output relation of the digital gamma correction based on the drop amount of the power source voltage ELVDD.

Figure 3:
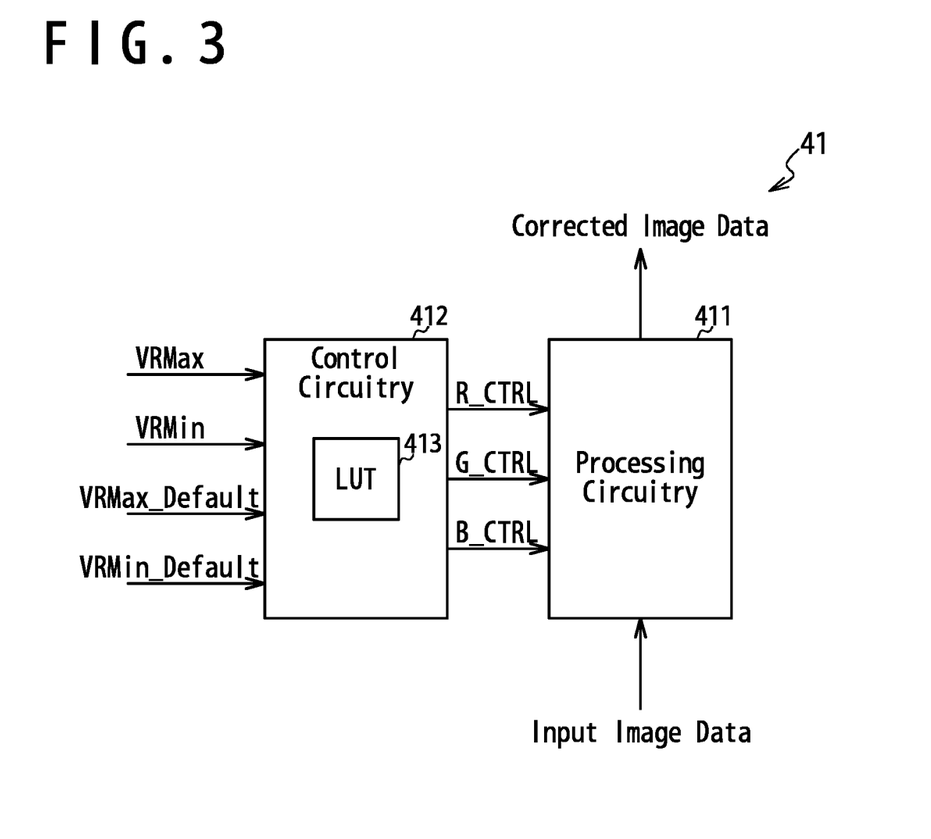
FIG. 3 is a block circuit diagram illustrating one example configuration of digital gamma correction circuitry, according to one or more embodiments.

In one or more embodiments, as illustrated in FIG. 3, the digital gamma correction circuitry 41 comprises processing circuitry 411 and control circuitry 412. In one or more embodiments, the processing circuitry 411 is configured to receive the input image data and generate the corrected image data by performing the digital gamma correction on the input image data. In one or more embodiments, the control circuitry 412 is configured to supply to the processing circuitry 411 control parameters to control the input-output characteristics of the digital gamma correction performed by the processing circuitry 411. In one or more embodiments, the processing circuitry 411 is configured to perform the digital gamma correction based on the control parameters supplied thereto.

In one or more embodiments, the control circuitry 412 is configured to receive the highest grayscale voltage command value VRMax and the lowest grayscale voltage command value VRMin from the highest/lowest grayscale voltage value calculation circuitry 54. In one or more embodiments, the control circuitry 412 is further configured to receive the default values VRMax_Default and VRMin_Default from the register circuitry 51. In one or more embodiments, the control circuitry 412 is configured to calculate the correction amount of the correction performed in the highest/lowest grayscale voltage value calculation circuitry 54, based on the highest grayscale voltage command value VRMax, the lowest grayscale voltage command value VRMin, the default values VRMax_Default and VRMin_Default, which are supplied to the grayscale voltage generator circuitry 42. In one or more embodiments, the correction amount is calculated based on the difference between the highest grayscale voltage command value VRMax and the default value VRMax_Default and the difference between the lowest grayscale voltage command value VRMin and the default value VRMin_Default. In one or more embodiments, these differences may be coincident with each other, depending on the calculation scheme of the highest grayscale voltage command value VRMax and the lowest grayscale voltage command value VRMin used in the highest/lowest grayscale voltage value calculation circuitry 54.

In one or more embodiments, the control circuitry 412 is configured to generate the control parameters to control the input-output characteristics of the digital gamma correction performed in the processing circuitry 411, based on the calculated correction amount. In one or more embodiments, the control circuitry 412 is configured to individually generate the control parameters for respective colors of the subpixels of the display panel 2. The colors of the subpixels may comprise red, green, and blue. The display panel 2 may further comprise subpixels configured to display a color other than red, green, and blue. In one or more embodiments, this may effectively reduce or suppress an effect of variations in the correspondence relation between the grayscale value and the drive voltage and improve the color balance. In one or more embodiments, the control circuitry 412 is configured to generate R control parameters R_CTRL to control the input-output characteristics of the digital gamma correction for the red (R) color, G control parameters G_CTRL to control the input-output characteristics of the digital gamma correction for the green (G) color, and B control parameters B_CTRL to control the input-output characteristics of the digital gamma correction for the blue (B) color. Note that the combination of colors is not limited to that disclosed herein.

In one or more embodiments, the correction amount calculated in the control circuitry 412 is the value determined by the highest/lowest grayscale voltage value calculation circuitry 54 based on the drop amount of the power source voltage ELVDD. In such embodiments, the control circuitry 412 resultingly generates, based on the drop amount, the control parameters to control the input-output characteristics of the digital gamma correction.

In one or more embodiments, the control circuitry 412 comprises a digital gamma correction control lookup table (LUT) 413. In one or more embodiments, the digital gamma correction control LUT 413 comprises correlation information indicative of a correlation between the correction amount and the control parameters. In such embodiments, since the correction amount is determined based on the drop amount of the power source voltage ELVDD, the digital gamma correction control LUT 413 resultingly comprises correlation information which correlates the drop amount to the control parameters. In one or more embodiments, the digital gamma correction control LUT 413 comprises correlation information indicative of a correlation between the drop amount and the control parameters individually for the respective colors of the subpixels of the display panel 2. In such embodiments, the control circuitry 412 may be configured to generate the R control parameters R_CTRL, the G control parameters G_CTRL, and the B control parameters B_CTRL by referring to the digital gamma correction control LUT 413 to read out the control parameters correlated with the correction amount or the drop amount.

In one or more embodiments, all or some of the control of the PMIC 3 by the PMIC control circuitry 44, the control of the highest and lowest grayscale voltages by the grayscale voltage control circuitry 45, and the control of the digital gamma correction by the digital gamma correction circuitry 41 are used to reduce or suppress an effect of a drop of the power source voltage ELVDD on the image quality of the display panel 2. In one or more embodiments, control of the digital gamma correction by the digital gamma correction circuitry 41 occurs more quickly than the control of the grayscale voltages by the grayscale voltage control circuitry 45 which occurs more quickly than the control of the power source voltage ELVDD by the PMIC control circuitry 44. In one or more embodiments, the PMIC control circuitry 44 is able to directly control the power source voltage ELVDD, the grayscale voltage control circuitry 45 is able to control the overall distribution of the grayscale voltages, and the digital gamma correction circuitry 41 is able to individually control the shape of the input-output curve of the digital gamma correction for the respective colors of the subpixels.

Figure 4:
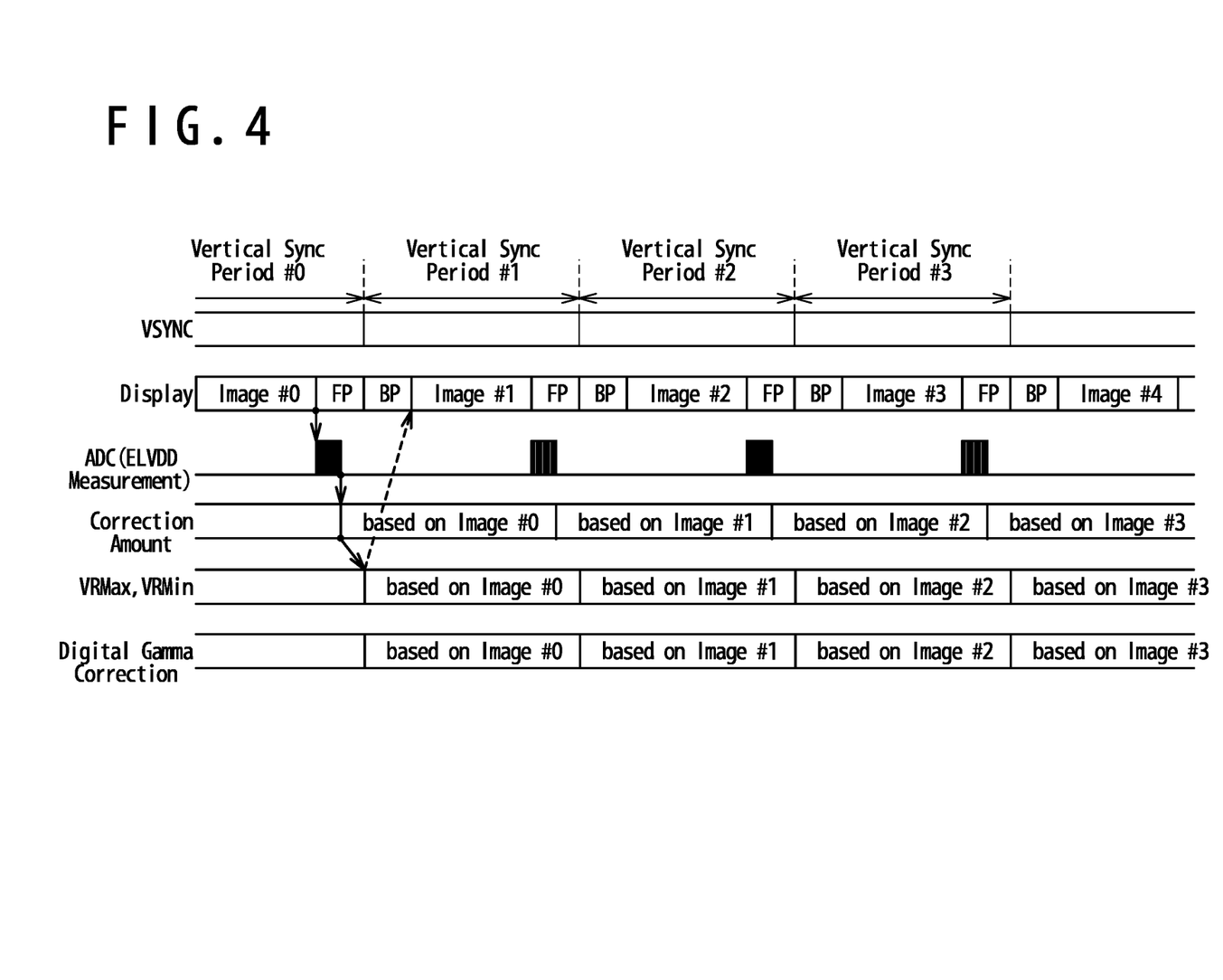
FIG. 4 is a timing chart illustrating one example operation of a display driver, according to one or more embodiments.

Referring to FIG. 4, in one or more embodiments, when a drop of the power source voltage ELVDD occurs in a certain vertical sync period, the drop of the power source voltage ELVDD is reflected to the control of the digital gamma correction and the control of the highest and lowest grayscale voltages in the next vertical sync period. In one or more embodiments, the power source voltage ELVDD is measured by the ADC circuitry 52 in the front porch period of each vertical sync period. In FIG. 4, the front porch periods, which are located at the ends of respective vertical sync periods, are denoted by the symbol "FP", and the back porch periods, which are located at the beginnings of the respective vertical sync periods, are denoted by the symbol "BP." In one or more embodiments, the controls of the digital gamma correction and the highest and lowest grayscale voltages in each vertical sync period are based on the power source voltage ELVDD measured in the front porch period of the previous vertical sync period.

In one or more embodiments, the drop amount of the power source voltage ELVDD is calculated after the power source voltage ELVDD is measured in vertical sync period #i, and a correction amount used to calculate the highest grayscale voltage command value VRMax and the lowest grayscale voltage command value VRMin in the next vertical sync period #(i+1) is determined based on the drop amount. In one or more embodiments, the highest grayscale voltage command value VRMax and lowest grayscale voltage command value VRMin to be used in the next vertical sync period #(i+1) are further calculated based on the correction amount. In one or more embodiments, in the next vertical sync period #(i+1), the highest and lowest grayscale voltages are controlled based on the highest grayscale voltage command value VRMax and lowest grayscale voltage command value VRMin thus calculated. In one or more embodiments, the digital gamma correction is controlled in the next vertical sync period #(i+1), based on the correction amount determined based on the power source voltage ELVDD in vertical sync period #i.

In one or more embodiments, the controls of the highest and lowest grayscale voltages and the digital gamma correction in vertical sync period #(i+1) are based on image #i displayed in the previous vertical sync period #i. In one or more embodiments, image #0 is displayed during vertical sync period #0 and the drop amount of the power source voltage ELVDD during vertical sync period #0 reflects the current through the display panel 2 caused by displaying image #0 during vertical sync period #0. In one or more embodiments, the correction amount used to calculate the highest grayscale voltage command value VRMax and the lowest grayscale voltage command value VRMin in vertical sync period #1 is based on the drop amount of the power source voltage ELVDD during vertical sync period #0, and accordingly the highest grayscale voltage command value VRMax and the lowest grayscale voltage command value VRMin in vertical sync period #1 reflects image #0. In one or more embodiments, the control of the digital gamma correction in vertical sync period #1 depends on the highest grayscale voltage command value VRMax and the lowest grayscale voltage command value VRMin in vertical sync period #0, accordingly reflecting image #0.

In one or more embodiments, correction amounts respectively calculated for a plurality of vertical sync periods may be held in the grayscale voltage control circuitry 45, and the highest grayscale voltage command value VRMax and the lowest grayscale voltage command value VRMin may be calculated based on a correction amount obtained by averaging the correction amounts held in the grayscale voltage control circuitry 45. This operation maintains the highest and lowest grayscale voltages and the control parameters at substantially constant values when the current through the display panel 2 changes during each vertical sync periods. This effectively suppresses generation of flicker (e.g., a change in brightness) when updating the display panel 2.

Figure 5:
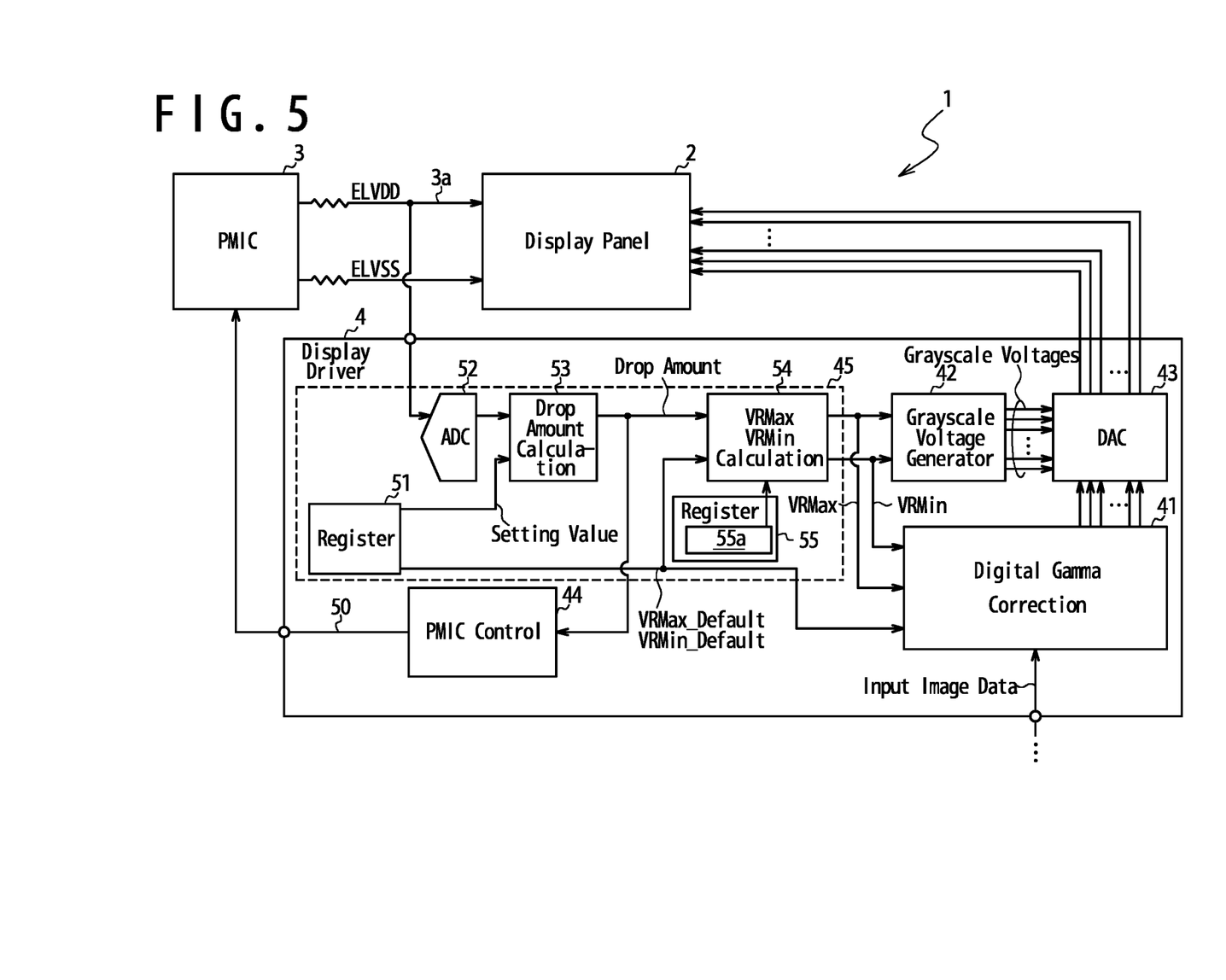
FIG. 5 is a block circuit diagram illustrating one example configuration of a display device, according to one or more embodiments.

In one or more embodiments, as illustrated in FIG. 5, the grayscale voltage control circuitry 45 may comprise register circuitry 55 configured to store correlation information 55a indicative of a correlation between the drop amount ΔELVDD of the power source voltage ELVDD and the correction amount used to calculate the highest grayscale voltage command value VRMax and the lowest grayscale voltage command value VRMin, and the highest/lowest grayscale voltage value calculation circuitry 54 may be configured to determine the correction amount used to calculate the highest grayscale voltage command value VRMax and the lowest grayscale voltage command value VRMin based on the correlation information 55a. In one or more embodiments, the correlation information 55a is configured so that the correlation between the drop amount ΔELVDD of the power source voltage ELVDD and the correction amount used to calculate the highest grayscale voltage command value VRMax is non-linear. In one or more embodiments, the correlation information 55a is configured so that the correlation between the drop amount ΔELVDD of the power source voltage ELVDD and the correction amount used to calculate the lowest grayscale voltage command value VRMin is non-linear. In one or more embodiments, the use of the correlation information 55a indicating the nonlinear correlation allows appropriately determining the correction amount, according to the characteristics of the display panel 2.

Figure 6:
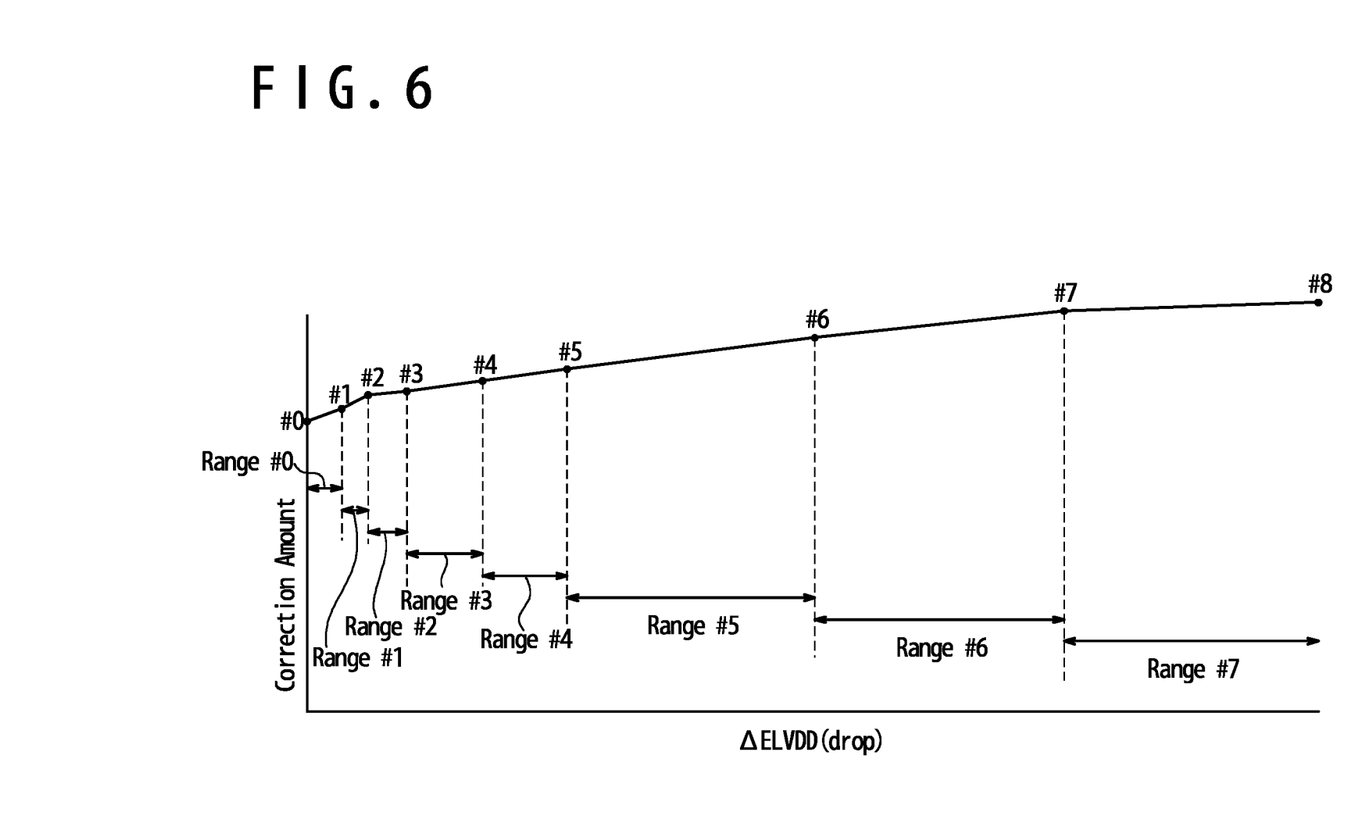
FIG. 6 illustrates one example correlation between a drop amount of a power source voltage and a correction amount, according to one or more embodiments.

In one or more embodiments, as illustrated in FIG. 6, a plurality of ranges #0 to #7 are defined with respect to the drop amount ΔELVDD of the power source voltage ELVDD and the correlation information 55a is allowed to individually set the increase rates of the correction amount against the drop amount ΔELVDD for the respective ranges #0 to #7. In one or more embodiments, the correlation information 55a specifies the correction amount at the boundary of every adjacent two of ranges #0 to #7. In one or more embodiments, the correlation information 55a specifies correction amount of #i at the lower limit of each range #i and correction amount of #(i+1) at the upper limit of each range #i. In one more embodiments, the highest/lowest grayscale voltage value calculation circuitry 54 may calculate the correction amount used to calculate the highest grayscale voltage command value VRMax and/or the lowest grayscale voltage command value VRMin through interpolation of correction amount of #i and correction amount ofs #(i+1), when the drop amount ΔELVDD of the power source voltage ELVDD is in range #i. In one or more embodiments, correction amounts of #0 to #8 may be defined so that the relation between the drop amount ΔELVDD of the power source voltage ELVDD and the correction amount used to calculate the highest grayscale voltage command value VRMax and/or the lowest grayscale voltage command value VRMin is non-linear.

Figure 7:
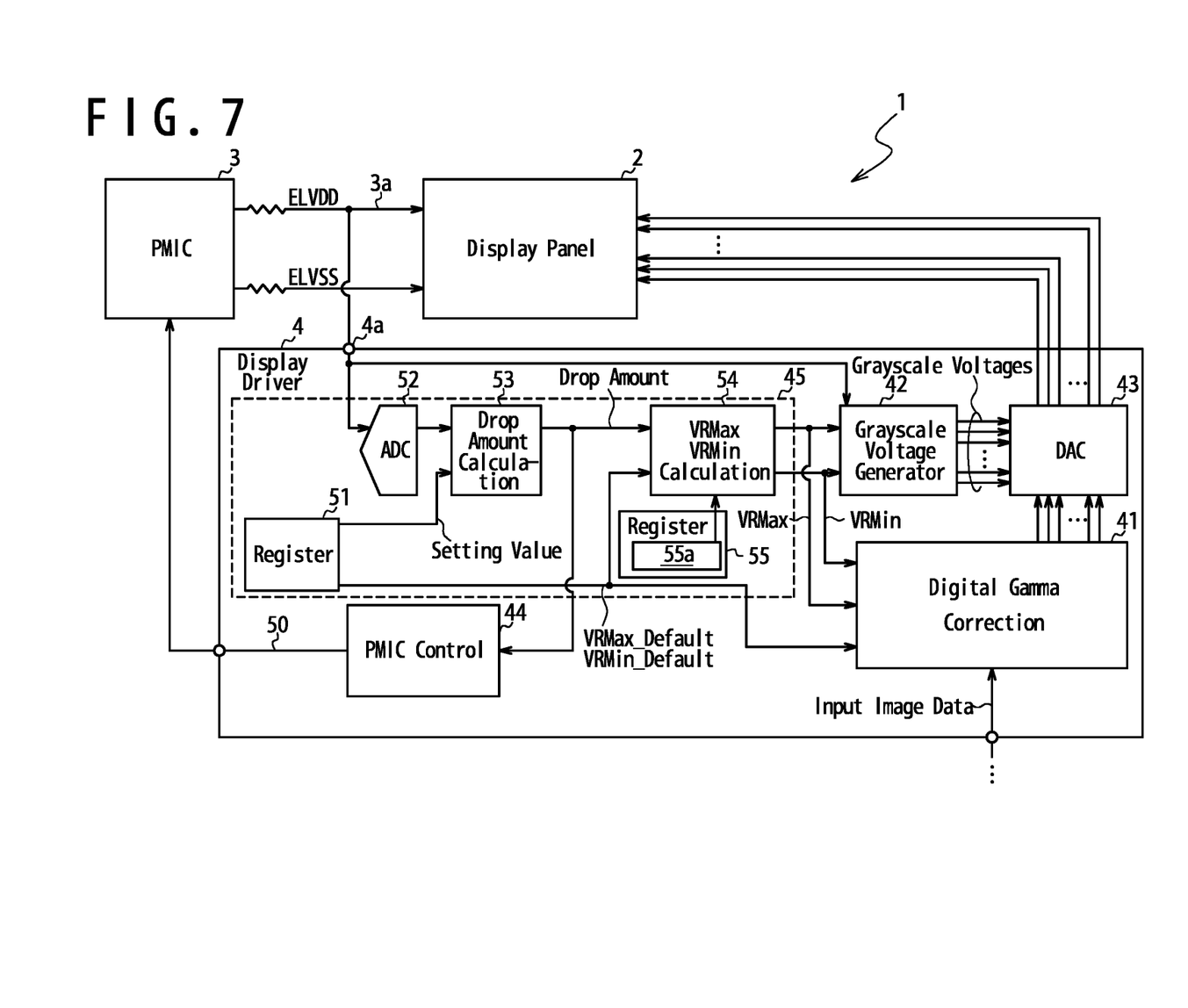
FIG. 7 is a block circuit diagram illustrating one example configuration of a display device, according to one or more embodiments.

In one or more embodiments, as illustrated in FIG. 7, the power source voltage ELVDD inputted to an external connection terminal 4a of the display driver 4 is supplied also to the grayscale voltage generator circuitry 42 in addition to the ADC circuitry 52 and the grayscale voltage generator circuitry 42 is configured to generate the grayscale voltages while compensating the drop of the power source voltage ELVDD through analog processing. In one or more embodiments, this configuration enables real-time compensation of the drop of the power source voltage ELVDD.

Figure 8:
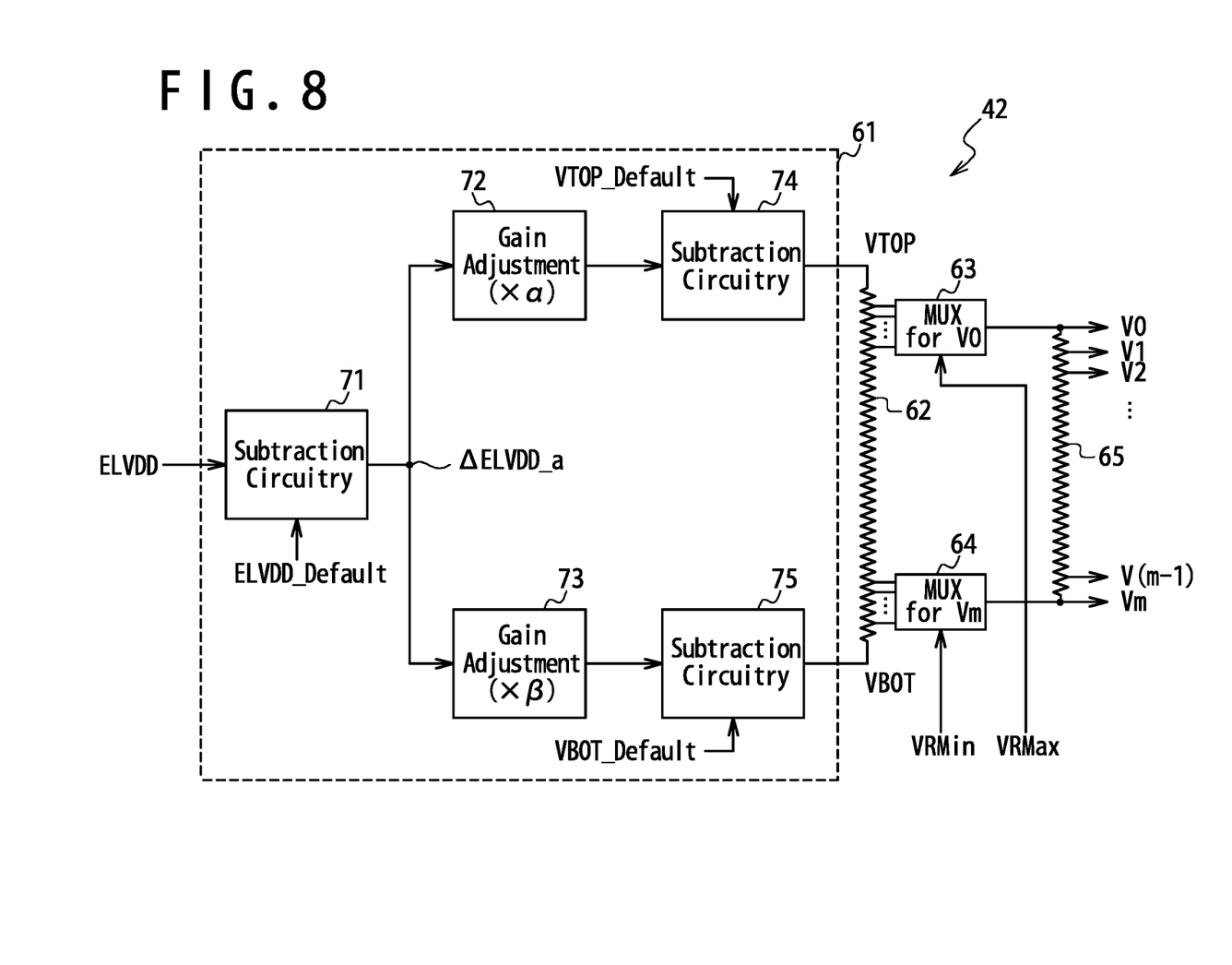
FIG. 8 is a block circuit diagram illustrating one example configuration of grayscale voltage generator circuitry, according to one or more embodiments.

In one or more embodiments, as illustrated in FIG. 8, the grayscale voltage generator circuitry 42 comprises ELVDD compensation circuitry 61, a resistor string 62, multiplexers 63, 64, and a resistor string 65. In one or more embodiments, the ELVDD compensation circuitry 61 is configured to supply a top voltage VTOP and a bottom voltage VBOT to the ends of the resistor string 62, respectively. In one or more embodiments, the resistor string 62 is configured to generate tap voltages on a plurality of taps, respectively, through voltage dividing of the top voltage VTOP and the bottom voltage VBOT. In one or more embodiments, the multiplexers 63 and 64 are configured to generate the highest grayscale voltage V0 and the lowest grayscale voltage Vm, respectively, based on the tap voltages generated on the plurality of taps of the resistor string 62. In one or more embodiments, the inputs of the multiplexer 63 are connected to a plurality of taps of the resistor string 62, and the multiplexer 63 is configured to select the highest grayscale voltage V0 from among the tap voltages generated on the plurality of taps, based on the highest grayscale voltage command value VRMax received from the highest/lowest grayscale voltage value calculation circuitry 54. In one or more embodiments, the inputs of the multiplexer 64 are connected to a plurality of taps of the resistor string 62, and the multiplexer 64 is configured to select the lowest grayscale voltage Vm from among the tap voltages generated on the plurality of taps, based on the lowest grayscale voltage command value VRMin received from the highest/lowest grayscale voltage value calculation circuitry 54. In one or more embodiments, the highest grayscale voltage V0 and lowest grayscale voltage Vm thus selected are supplied to the resistor string 65. In one or more embodiments, the resistor string 65 is configured to generate intermediate grayscale voltages V1 to V(m−1) through voltage dividing of the highest grayscale voltage V0 and the lowest grayscale voltage Vm.

In one or more embodiments, the ELVDD compensation circuitry 61 is configured to, when a drop of the power source voltage ELVDD occurs, generate the top voltage VTOP and the bottom voltage VBOT to compensate the drop of the power source voltage ELVDD. In one or more embodiments, the ELVDD compensation circuitry 61 is configured as analog circuitry which compensates the drop of the power source voltage ELVDD through analog processing.

In one or more embodiments, the ELVDD compensation circuitry 61 comprises subtraction circuitry 71, gain adjustment circuitries 72, 73, and subtraction circuitries 74 and 75. In one or more embodiments, the subtraction circuitry 71 is configured as an analog subtraction circuitry which generates an analog difference voltage ΔELVDD_a corresponding to the difference between the ELVDD reference voltage ELVDD_Default and the power source voltage ELVDD inputted to the external connection terminal 4a, where the ELVDD reference voltage ELVDD_Default has a default voltage level of the power source voltage ELVDD. In one or more embodiments, the analog difference voltage ΔELVDD_a corresponds to the drop amount of the power source voltage ELVDD. In one or more embodiments, the gain adjustment circuitry 72 is configured to adjust a gain α for the analog difference voltage ΔELVDD_a in the generation of the top voltage VTOP. In one or more embodiments, the gain adjustment circuitry 72 is configured as an analog multiplier circuit which outputs a voltage of α times of the analog difference voltage ΔELVDD_a. In one or more embodiments, the gain adjustment circuitry 73 is configured to adjust a gain β for the analog difference voltage ΔELVDD_a in the generation of the bottom voltage VBOT. In one or more embodiments, the gain adjustment circuitry 73 is configured as an analog multiplier circuit which outputs a voltage of β times of the analog difference voltage ΔELVDD_a. In one or embodiments, the subtraction circuitry 74 is configured as an analog subtraction circuit which outputs a voltage obtained by subtracting a voltage α·ΔELVDD_a from the default top voltage VTOP_Default, where the voltage α·ΔELVDD_a is outputted from the gain adjustment circuitry 72. In one or more embodiments, the output voltage from the subtraction circuitry 74 is supplied to one end of the resistor string 62 as the top voltage VTOP. In one or embodiments, the subtraction circuitry 75 is configured as an analog subtraction circuit configured to output a voltage obtained by subtracting a voltage β·ΔELVDD_a from the default bottom voltage VBOT_Default, where the voltage β·ΔELVDD_a is outputted from the gain adjustment circuitry 73. In one or more embodiments, the output voltage from the subtraction circuitry 75 is supplied to the other end of the resistor string 62 as the bottom voltage VBOT.

In one or more embodiments, the ELVDD compensation circuitry 61 thus configured generates the top voltage VTOP and the bottom voltage VBOT through analog processing on the power source voltage ELVDD, the ELVDD reference voltage ELVDD_Default, the default top voltage VTOP_Default and the default bottom voltage VBOT_Default. In one or more embodiments, the top voltage VTOP and the bottom voltage VBOT are represented by the following expressions (1) and (2), respectively:

$$VTOP=VTOP\_Default-\alpha \cdot \Delta ELVDD\_a, \text{ and} \quad (1)$$

$$VBOT=VBOT\_Default-\beta \cdot \Delta ELVDD\_a. \quad (2)$$

In one or more embodiments, when a drop of the power source voltage ELVDD does not occur, that is, when ΔELVDD_a is zero, the top voltage VTOP and the bottom voltage VBOT generated by the ELVDD compensation circuitry 61 are identical to the default top voltage VTOP_Default and the default bottom voltage VBOT_Default, respectively.

In one or more embodiments, when a drop of the power source voltage ELVDD occurs in a certain vertical sync period, the top voltage VTOP and the bottom voltage VBOT for which the drop of the power source voltage ELVDD is compensated are generated through analog processing by the ELVDD compensation circuitry 61. In one or more embodiments, the drop of the power source voltage ELVDD is instantly compensated. In one or more embodiments, the grayscale voltage generator circuitry 42 starts to supply grayscale voltages V0 to Vm for which the drop of the power source voltage ELVDD is compensated immediately after the drop of the power source voltage ELVDD occurs. In one or more embodiments, digital gamma correction for compensation of the drop of the power source voltage ELVDD for the individual colors starts in the vertical sync period following the vertical sync period in which the drop of the power source voltage ELVDD occurs. In one or more embodiments, such operation improves the responsiveness of the compensation to the drop of the power source voltage ELVDD and further improves the color balance.

Although various embodiments of this disclosure have been specifically described herein, a person skilled in the art would appreciate that the technologies disclosed herein may be implemented with various modifications.

What is claimed is:

1. A display driver comprising:
    drop amount calculation circuitry configured to calculate a drop amount of a power source voltage based on a difference between a setting value of the power source voltage and a voltage calculated at an input to a display panel;
    grayscale voltage value calculation circuitry configured to calculate a grayscale voltage command value based on the drop amount; and
    digital gamma correction circuitry configured to perform digital gamma correction on an input image data based on the grayscale voltage command value.

2. The display driver, according to claim 1, wherein the digital gamma correction circuitry is configured to individually perform the digital gamma correction for each color of subpixels of the display panel based on the drop amount.

3. The display driver according to claim 1, wherein the digital gamma correction circuitry comprises:
    control circuitry configured to generate control parameters for controlling input-output characteristics of the digital gamma correction based on the drop amount; and
    processing circuitry configured to generate corrected image data by performing the digital gamma correction on the input image data based on the control parameters.

4. The display driver according to claim 3, wherein the control circuitry is configured to individually generate the control parameters for each color of subpixels of the display panel.

5. The display driver according to claim 3, wherein the control circuitry comprises first correlation information which correlates the drop amount with the control parameters.

6. The display driver according to claim 3,
    wherein calculating the grayscale voltage command value based on the drop amount comprises calculating a highest grayscale voltage command value and a lowest grayscale voltage command value by correcting default values of a highest grayscale voltage and a lowest grayscale voltage with a correction amount based on the drop amount, and
    wherein the control circuitry comprises a digital gamma correction control lookup table (LUT) comprising first correlation information indicative of a correlation between the correction amount and the control parameters.

7. The display driver according to claim 6, further comprising:
    grayscale voltage generator circuitry configured to generate a plurality of grayscale voltages based on the highest grayscale voltage command value and the lowest grayscale voltage command value; and
    digital-analog conversion circuitry configured to generate drive voltages corresponding to grayscale values included in the corrected image data based on the plurality of grayscale voltages to drive the display panel.

8. The display driver according to claim 7, wherein the grayscale voltage generator circuitry is further configured to:
    generate an analog difference voltage corresponding to a difference between the power source voltage and a reference voltage; and
    generate the plurality of grayscale voltages based on the analog difference voltage.

9. The display driver according to claim 8,
    wherein the grayscale voltage generator circuitry comprises an analog circuit configured to:
    generate the analog difference voltage; and
    generate a top voltage and a bottom voltage based on the analog difference voltage, and
    wherein the grayscale voltage generator circuitry is further configured to:
    generate a plurality of tap voltages through voltage dividing of the top voltage and the bottom voltage; and
    generate the highest grayscale voltage and the lowest grayscale voltage of the plurality of grayscale voltages based on the plurality of tap voltages.

10. The display driver according to claim 9, wherein the grayscale voltage generator circuitry is further configured to:
    select the highest grayscale voltage from among the plurality of tap voltages based on the highest grayscale voltage command value; and
    select the lowest grayscale voltage from among the plurality of tap voltages based on the lowest grayscale voltage command value.

11. The display driver according to claim 6, further comprising register circuitry configured to store the setting value and the default values.

12. The display driver according to claim 3,
    wherein calculating the grayscale voltage command value based on the drop amount comprises:
    calculating a highest grayscale voltage command value and a lowest grayscale voltage command value by correcting default values of a highest grayscale voltage and a lowest grayscale voltage with a correction amount based on the drop amount; and
    register circuitry configured to store second correlation information indicative of a correlation between the drop amount and the correction amount, and wherein the grayscale voltage value calculation circuitry is further configured to determine the correction amount based on the second correlation information.

13. The display driver according to claim 12, wherein the second correlation information is set so that a correlation between the drop amount and the
    correction amount is non-linear.

14. The display driver according to claim 1, further comprising:
    power management integrated circuit (PMIC) control circuitry configured to generate, based on the drop amount, a control signal to control a PMIC configured to generate the power source voltage.

15. A display driver comprising:
    drop amount calculation circuitry configured to calculate a drop amount of a power source voltage based on a difference between a setting value of the power source voltage and a voltage calculated at an input to a display panel; and
    power management integrated circuit (PMIC) control circuitry configured to:

generate, based on the drop amount, a control signal; and supply the control signal to control a PMIC, wherein the PMIC is configured to control the power source voltage based on the control signal.

16. The display driver according to claim 15, further comprising:

power source voltage measurement circuitry configured to measure the power source voltage supplied to the display panel.

17. The display driver according to claim 16, wherein the power source voltage measurement circuitry is configured to receive the power source voltage from a position closer to the display panel than to the PMIC.

18. A display method comprising:

calculating a drop amount of a power source voltage based on a difference between a setting value of the power source voltage and a voltage calculated at an input to a display panel;

calculating a grayscale voltage command value based on the drop amount; and performing digital gamma correction on an input image data based on the grayscale voltage command value.

19. The display method according to claim 18, further comprising:

individually performing the digital gamma correction for each color of subpixels of the display panel.

20. The display method according to claim 18 further comprising:

outputting control parameters for controlling input-output characteristics of the digital gamma correction based on the drop amount; and generating a corrected image data by performing the digital gamma correction on the input image data based on the control parameters.

21. The display method according to claim 20, wherein outputting the control parameters comprises:

individually generating the control parameters for each color of subpixels of the display panel.

22. The display method according to claim 20, wherein outputting the control parameters comprises:

referring to a digital gamma correction control LUT comprising correlation information which correlates the drop amount with the control parameters to read out the control parameters correlated with the drop amount.

23. The display method according to claim 20, wherein calculating the grayscale voltage command value based on the drop amount comprises:

calculating a highest grayscale voltage command value and a lowest grayscale voltage command value by correcting default values of a highest grayscale voltage and a lowest grayscale voltage with a correction amount based on the drop amount, and wherein outputting the control parameters comprises:

referring to a digital gamma correction control LUT comprising correlation information indicative of a correlation between the correction amount and the control parameters to output the control parameters corresponding to the correction amount.

24. The display method according to claim 23, further comprising:

generating a plurality of grayscale voltages based on the highest grayscale voltage command value and the lowest grayscale voltage command value; and generating drive voltages corresponding to grayscale values included in the corrected image data based on the plurality of grayscale voltages to drive the display panel.

25. The display method according to claim 24, further comprising:

generating an analog difference voltage corresponding to a difference between the power source voltage and a reference voltage, wherein generating the plurality of grayscale voltages comprises:

generating the plurality of grayscale voltages based on the analog difference voltage.

26. The display method according to claim 20, wherein calculating the grayscale voltage command value based on the drop amount comprises:

calculating a highest grayscale voltage command value and a lowest grayscale voltage command value by correcting default values of a highest grayscale voltage and a lowest grayscale voltage with a correction amount based on the drop amount; and storing second correlation information indicative of a correlation between the drop amount and the correction amount, and wherein calculating the highest grayscale voltage command value and the lowest grayscale voltage command value comprises determining the correction amount based on the second correlation information.

27. The display method according to claim 18, further comprising:

generating a control signal to control a PMIC configured to generate the power source voltage based on the drop amount.

* * * * *